(12) United States Patent
Sung et al.

(10) Patent No.: US 12,119,140 B2
(45) Date of Patent: Oct. 15, 2024

(54) INSULATING BUSHING (71) Applicant: HWASEUNG CORPORATION CO., LTD., Busan (KR)

(72) Inventors: Il Kyung Sung, Busan (KR); Jong Ho Kim, Busan (KR); Sang Su Bae, Busan (KR); Seung Hwan Lee, Busan (KR); Yu Jin Jo, Busan (KR)

(73) Assignee: HWASEUNG CORPORATION CO., LTD., Busan (KR)

( * ) Notice: Subject to any disclaimer, the term of this patent is extended or adjusted under 35 U.S.C. 154(b) by 252 days.

(21) Appl. No.: 17/865,207

(22) Filed: Jul. 14, 2022

(65) Prior Publication Data
US 2023/0074057 A1 Mar. 9, 2023

(30) Foreign Application Priority Data
Sep. 2, 2021 (KR) .......................... 10-2021-0117182

(51) Int. Cl.
*H01B 17/26* (2006.01)

(52) U.S. Cl.
CPC .................................... *H01B 17/26* (2013.01)

(58) Field of Classification Search
CPC ...... H01B 17/26; H01B 17/265; H01B 17/30; H01B 17/301; H01B 17/00; H01B 17/005; H01B 17/14; H01B 17/303; H01F 27/04; H01F 27/06; H01F 27/02; H02G 5/025; H02G 5/00; H02G 5/02; H02G 5/002
USPC ........ 174/181, 137 R, 176, 177, 72 B, 71 B, 174/88 B, 70 B, 138 R, 142, 152 R, 174/153 G, 152 G; 361/637, 648, 611, 361/624
See application file for complete search history.

(56) References Cited

U.S. PATENT DOCUMENTS

| | | | | |
|---|---|---|---|---|
| 3,861,777 A | * | 1/1975 | Clark | H01B 17/301 174/152 R |
| 4,956,525 A | * | 9/1990 | Wilk | H01B 17/301 174/152 R |
| 6,376,772 B1 | * | 4/2002 | Pioch | H01B 17/303 174/152 G |

FOREIGN PATENT DOCUMENTS

| | | |
|---|---|---|
| EM | EM001952615-0001 | 10/2021 |
| EP | 1 860 672 B1 | 7/2016 |
| EP | 1 860 671 B1 | 1/2017 |
| EP | 1 335 465 B1 | 3/2017 |
| EP | 2 366 189 B1 | 2/2018 |
| EP | 3 159 901 B1 | 4/2018 |
| FR | 2 545 641 A1 | 11/1984 |
| FR | 2 920 249 B1 | 11/2009 |
| JP | H11-315962 A | 11/1999 |
| JP | 2003-535435 A | 11/2003 |

* cited by examiner

*Primary Examiner* — Angel R Estrada (57) ABSTRACT

Disclosed herein is an insulating bushing adapted to protect a busbar and having improved waterproof performance. The insulating bushing includes: a first bushing provided with a first bushing passage through which the busbar passes; a second bushing provided with a first bushing-receiving portion receiving an upper portion of the first bushing inserted through a lower portion of the first bushing-receiving portion and a second bushing passage through which the busbar passes; and a cover coupled to an outer surface of the second bushing and provided with a cover passage through which the busbar passes.

14 Claims, 9 Drawing Sheets

INSULATING BUSHING

CROSS-REFERENCE TO RELATED APPLICATION

This patent document claims priority to and the benefit of Korean Patent Application No. 10-2021-0117182, filed on Sep. 2, 2021, the entire disclosure of which is incorporated by reference for all purposes as if fully set forth herein.

FIELD

The present invention relates to an insulating bushing and, more particularly, to an insulating bushing adapted to protect a conductive busbar for electrical connection of a switchboard, a transformer, a circuit breaker, an energy storage device, and the like installed outdoors and exposed to external environmental conditions, such as snow, rain, wind, and the like.

BACKGROUND

In general, a busbar is produced from copper and is used for electrical connection of a switchboard, a transformer, a circuit breaker, an energy storage device, and the like. In particular, in order to maintain a stable current flow in a high voltage environment, a general electric wire cannot be used and a rectangular or circular busbar having a large cross-sectional area is generally used in the art.

In use of a busbar in an environment where voltage is applied, there is high possibility of electrical interference and accidents when a constant insulation distance between the busbar and facilities or other external devices is not maintained. In order to solve such a problem, an outer surface of the busbar is coated with an insulator, such as silicone or polyethylene or surrounded by an insulating tape so as to keep the busbar in an insulated state.

However, since the insulator or the insulating tape is likely to be peeled off of the surface of the busbar due to friction or reduction in bonding strength over time, the insulator or the insulating tape cannot sufficiently perform its original functions of reducing electrical interference/resistance while preventing electrical accident, particularly when exposed to an external environment.

Accordingly, when the busbar is drawn in and out of a corresponding facility, an insulating bushing is used to protect the busbar from damage and to prevent flooding by rainwater, electric shock, fire accidents, and other accidents.

However, as disclosed in U.S. Pat. No. 6,376,772 (issue date: Apr. 23, 2002), a typical insulating bushing produced from Nylon, polyamide, and the like exhibits poor flame retardancy and thermal resistance, and has a low melting point resulting from material properties thereof, thereby providing a disadvantage in terms of shape and dimension management due to shape deformation. Moreover, the typical insulating bushing requires formation of cavities and/or slits due to the material properties thereof, which cause deterioration in manufacturing efficiency, durability and waterproof level (IPX5 level).

Therefore, there is a need for development of an insulating bushing that can satisfy high insulating properties while achieving improvement in various properties including waterproof performance, weather resistance, flame retardancy, and the like.

SUMMARY

Embodiments of the present invention are conceived to solve such problems in the art and it is an object of the present invention to provide an insulating bushing that satisfies high insulating properties while achieving improvement in mechanical and chemical properties, such as waterproof performance, weather resistance, flame retardancy, and the like.

It will be understood that the present invention is not limited to the above object and the above and other objects of the present invention will become apparent to those skilled in the art from the detailed description of the following embodiments in conjunction with the accompanying drawings.

In accordance with one aspect of the present invention, there is provided an insulating bushing adapted to protect a busbar and having improved waterproof performance, the insulating bushing including: a first bushing provided with a first bushing passage through which the busbar passes; a second bushing provided with a first bushing-receiving portion receiving an upper portion of the first bushing inserted through a lower portion of the first bushing-receiving portion and a second bushing passage through which the busbar passes; and a cover coupled to an outer surface of the second bushing and provided with a cover passage through which the busbar passes, wherein the second bushing includes: a second bushing body; and a second bushing flange protruding from a lower portion of the second bushing body in a lateral direction thereof to surround the lower portion of the second bushing body and formed with a plurality of second bushing bolt-holes, the second bushing flange being composed of second bushing flange long-sides and second bushing flange short-sides with reference to a shape of the second bushing passage, the second bushing flange long-sides having an M shape with peaks and a valley.

An insulating bushing according to one embodiment of the present invention satisfies high insulating properties while achieving improvement in waterproof performance and durability.

An insulating bushing according to one embodiment of the present invention exhibits not only good mechanical properties but also good chemical properties including weather resistance, flame retardancy, and the like.

DRAWINGS

The above and other aspects, features, and advantages of the present invention will become apparent from the detailed description of the following embodiments in conjunction with the accompanying drawings.

DETAILED DESCRIPTION

Hereinafter, embodiments of the present invention will be described with reference to the accompanying drawings. It should be understood that the present invention may be embodied in different ways and is not limited to the following embodiments, and that the following embodiments are given by way of illustration to provide a thorough understanding of the present invention to those skilled in the art Herein, when an element is referred to as being placed "on" or "under" another element, it can be directly placed on or under the other element, or intervening element(s) may be present. In addition, spatially relative terms, such as "upper" and "lower", are defined with reference to the accompanying drawings. Thus, it will be understood that "upper side" can be used interchangeably with "lower side".

Herein, like components are denoted by like reference numerals throughout the accompanying drawings. Moreover, when used in this specification, the terms "comprises," "comprising," "includes," "including," "having" and the like specify the presence of stated features, integers, steps, operations, elements, components, and/or groups thereof, but do not preclude the presence or addition of one or more other features, integers, steps, operations, elements, components, and/or groups thereof.

Herein, a horizontal direction refers to a lateral direction in which a second bushing flange extends from a second bushing body.

Herein, an inner side refers to a side close to the center and an outer side refers to a side away from the center in a plan view of an insulating bushing.

Hereinafter, embodiments of the present invention will be described with reference to the accompanying drawings.

Figure 1:
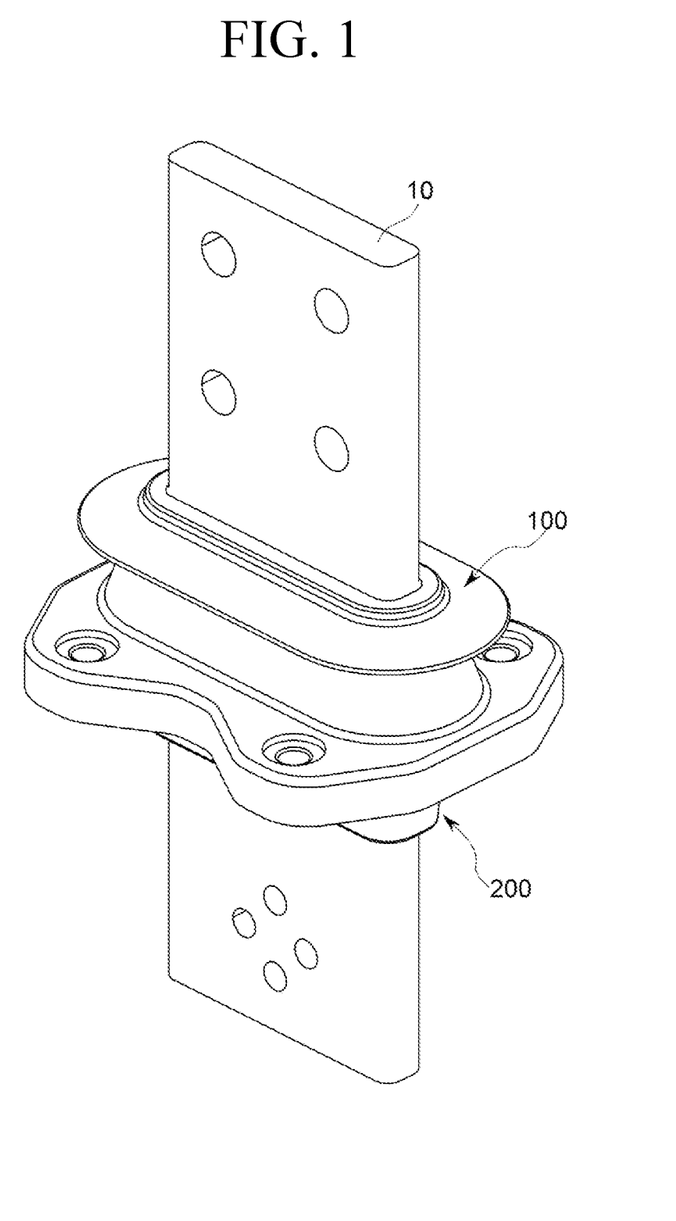
FIG. 1 is a top perspective view of an insulating bushing according to one embodiment of the present invention.
Figure 2:
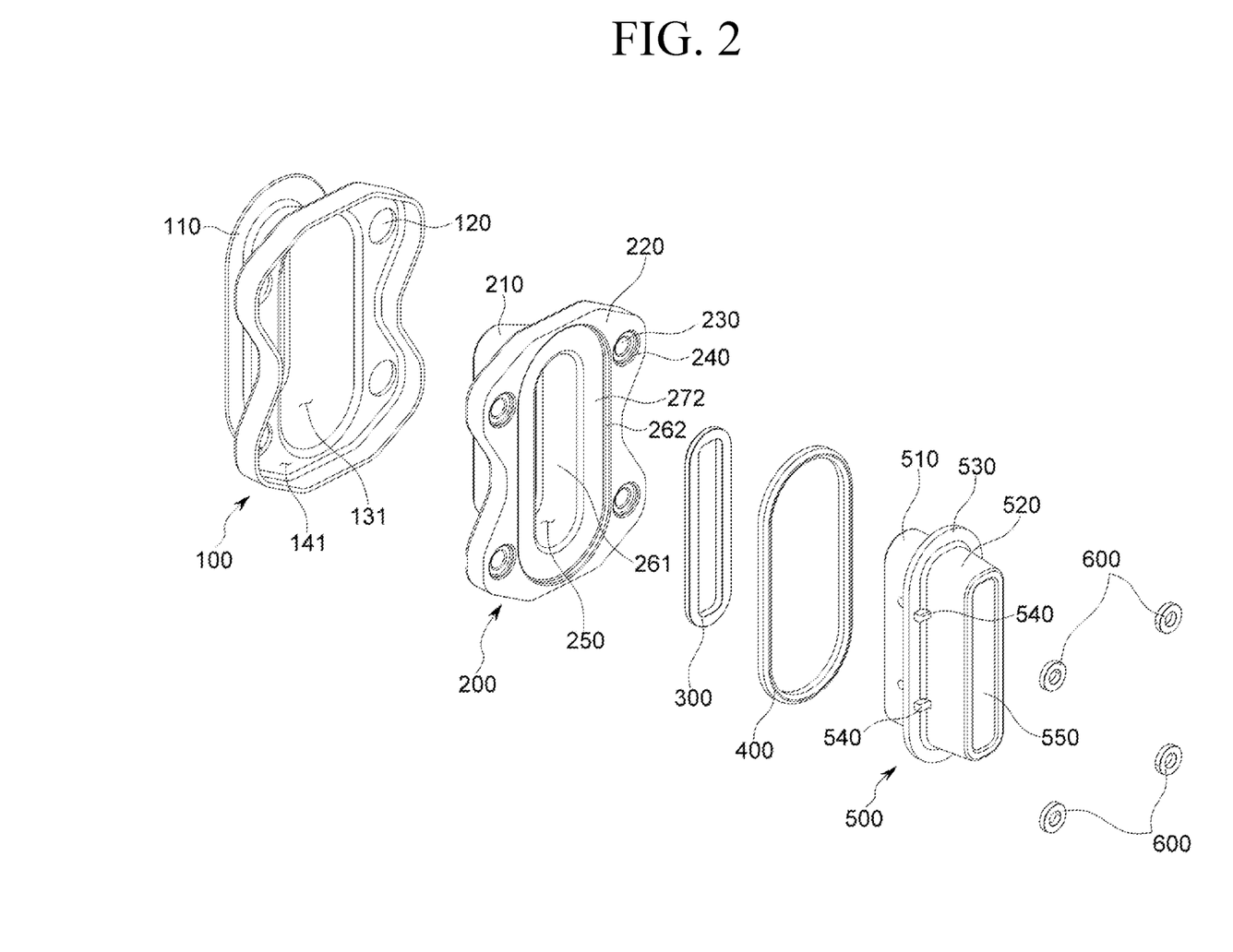
FIG. 2 is an exploded perspective view of the insulating bushing according to the embodiment of the present invention.

FIG. 1 is a top perspective view of an insulating bushing according to one embodiment of the present invention and FIG. 2 is an exploded perspective view of the insulating bushing according to the embodiment of the present invention.

Referring to FIG. 1 and FIG. 2, an insulating bushing according to one embodiment of the invention (hereinafter referred to as "insulating bushing") serves to protect a busbar 10 and includes a first bushing 500, a second bushing 200, a cover 100, a first gasket 300, a second gasket 400, and bolt washers 600, in which the busbar 10 penetrates the first bushing 500, the second bushing 200, and the cover 100.

The first bushing 500 has an upper first bushing portion 510 received in the second bushing 200 and a lower first bushing portion 520 protruding downward from the insulating bushing. Here, the first bushing 500 is provided with a first bushing stopper 530 protruding therefrom in a lateral direction to adjust a received depth of the first bushing in the second bushing 200.

The first bushing 500 is formed of a first bushing composition mainly consisting of an unsaturated polyester and glass fabrics. For example, the first bushing composition may include 10 wt % to 40 wt % of the unsaturated polyester, 5 wt % to 15 wt % of styrene, optionally 3 wt % or less of polyethylene, optionally 5 wt % or less of polystyrene, optionally 1 wt % or less of a peroxide, optionally 3 wt % or less of zinc distearate, 20 wt % to 60 wt % of aluminum hydroxide, and 5 wt % to 25 wt % of fiberglass wool. With this composition, the first busing exhibits better thermal durability and structural durability than a typical insulating bushing in the art, thereby allowing elimination of a reinforcing member extending from a lower surface of the first bushing stopper 530 to a lower end of the lower first bushing portion 520. That is, the insulating bushing according to this embodiment is characterized in that the first bushing 500 is not formed with the reinforcing member extending from the lower surface of the first bushing stopper 530 to the lower end of the lower first bushing portion 520.

The second bushing 200 includes a second bushing body 210, which is formed therein with a first bushing-receiving portion 250 adapted to receive the upper first bushing portion 510, and a second bushing flange 220 protruding from a lower portion of the upper first bushing portion 510 in the lateral direction. Here, the second bushing 200 constitutes a region that protrudes from a central portion of the insulating bushing in the lateral direction by the second bushing flange 220.

The second bushing 200 is formed of a second bushing composition mainly consisting of an unsaturated polyester and glass fabrics. For example, the second bushing composition may include 10 wt % to 40 wt % of the unsaturated polyester, 5 wt % to 15 wt % of styrene, optionally 3 wt % or less of polyethylene, optionally 5 wt % or less of polystyrene, optionally 1 wt % or less of a peroxide, optionally 3 wt % or less of zinc distearate, 20 wt % to 60 wt % of aluminum hydroxide, and 5 wt % to 25 wt % of fiberglass wool. With this composition, the second bushing exhibits better thermal durability and structural durability than a typical insulating bushing in the art, thereby allowing elimination of cavities or ribs on a lower surface of the second bushing flange 220. That is, the insulating bushing according to this embodiment is characterized in that the second bushing flange 220 has a flat lower surface excluding regions each formed with second bushing bolt-holes 230 in the second bushing 200.

The cover 100 is formed outside the second bushing 200 so as to surround the second bushing 200 and is formed to surround outer surfaces of the second bushing body 210 and the second bushing flange 220. Here, the cover 100 has a shape corresponding to the outer surface of the second bushing 200 and is further provided with an upper cover flange 110 protruding from an upper portion of the cover in the lateral direction.

The cover 100 is formed of a silicone resin. As a result, the cover can stably cover the first bushing 500 without being pushed on the surface of the first bushing 500 while securing good insulating properties, weather resistance, flame retardancy, and waterproof and drainage performance.

The first gasket 300 is disposed between an upper surface of the upper first bushing portion 510 and a first gasket seat 271 (see FIG. 9) formed on an inner surface of the second bushing 200.

The first gasket 300 may be formed of a silicone resin, thereby further improving waterproof performance of the insulating bushing.

The second gasket 400 is disposed between the first bushing stopper 530 and a second step 262 formed on an inner side of the second bushing flange 220.

The second gasket 400 may be formed of a silicone resin, thereby further improving waterproof performance of the insulating bushing.

Each of the bolt washers 600 is disposed in a bolt washer groove 240 on the second bushing flange 220 and serves to prevent second bushing flange peaks 221 (seen FIG. 4) from being damaged due to concentration of excessive stress on an M-shaped second bushing flange long-side 225 (see FIG. 4) while improving waterproof performance of the insulating bushing.

The bolt washers 600 may be formed of a silicone resin, thereby further improving waterproof performance of the insulating bushing.

Figure 3:
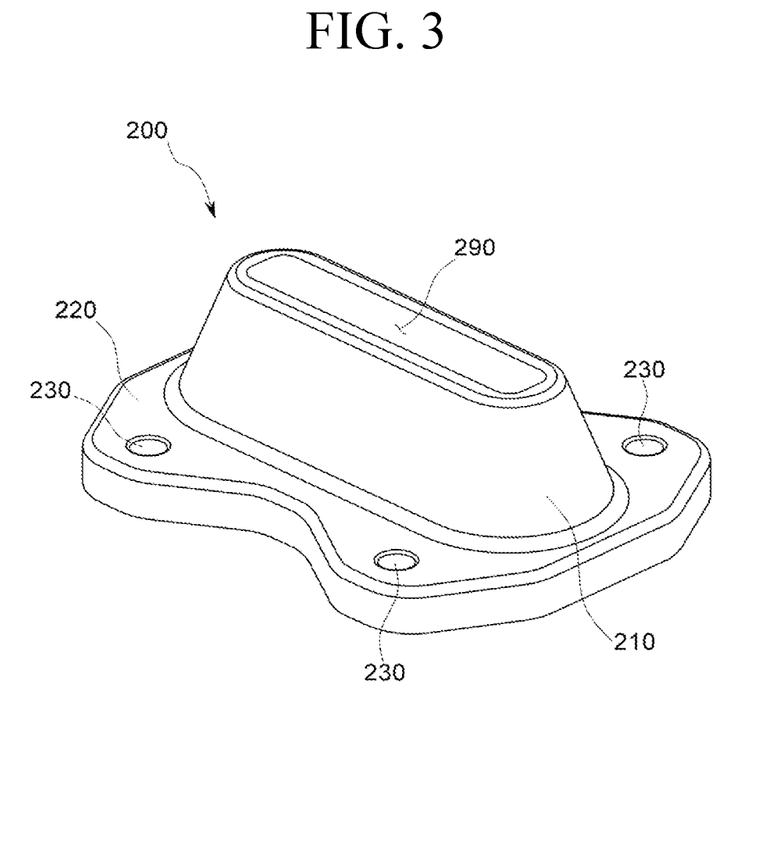
FIG. 3 is a view of a second bushing of the insulating bushing according to the embodiment of the present invention.
Figure 4:
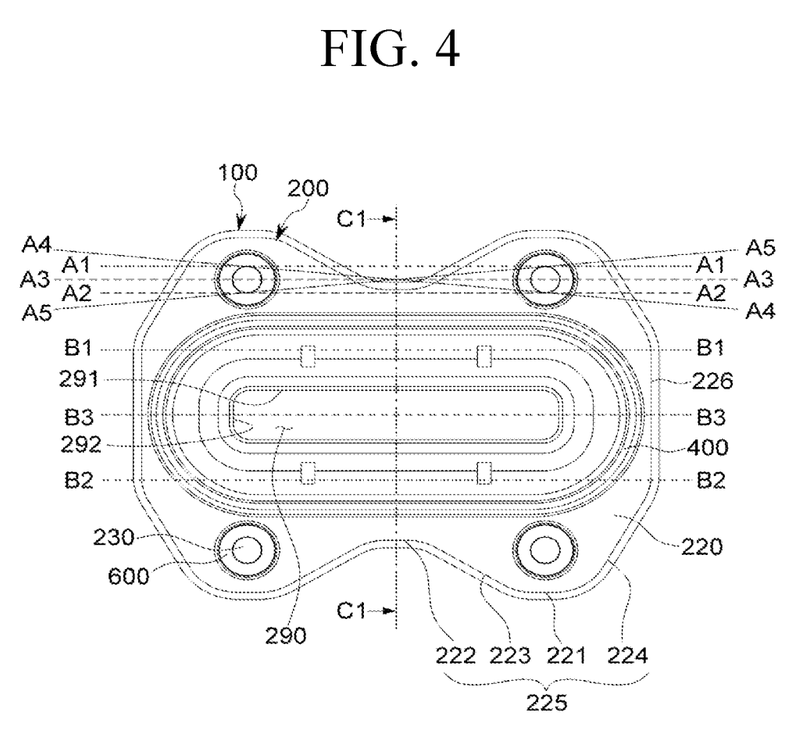
FIG. 4 is a bottom perspective view of the insulating bushing according to the embodiment of the present invention.

FIG. 3 is a view of the second bushing of the insulating bushing according to the embodiment of the present invention and FIG. 4 is a bottom perspective view of the insulating bushing according to the embodiment of the present invention.

Referring to FIG. 2 to FIG. 4, the second bushing 200 includes the second bushing body 210 and the second bushing flange 220.

The second bushing body 210 may have a shape extending in the vertical direction and having a horizontal cross-sectional area gradually decreasing in an upward direction. For example, the second bushing body 210 may have a tapered shape. As a result, the insulating bushing can achieve improvement in both insulating characteristics and drainage characteristics. For example, the second bushing body 210 is tilted at an angle of 10° to 30° from the second bushing flange 220. Within this range, the insulating bushing can achieve improvement in both insulating characteristics and drainage characteristics.

The second bushing body 210 is provided therein with a first bushing-receiving portion 250 receiving the upper first bushing portion 510 and is provided at an upper end thereof with a second bushing passage 290 through which the busbar 10 (see FIG. 1) passes.

The second bushing flange 220 protrudes from a lower portion of the second bushing body 210 in the lateral direction to surround the lower portion of the second bushing body 210 and is formed with a plurality of second bushing bolt-holes 230.

Referring to FIG. 4, the second bushing flange 220 may be composed of second bushing flange long-sides 225 and second bushing flange short-sides 226 with reference to the shape of the second bushing passage 290, in which the second bushing flange long-sides have an M shape with peaks and a valley. With this configuration, the insulating bushing can achieve improvement in waterproof performance. For example, one pair of second bushing flange long-side 225 and second bushing flange short-side 226 is disposed to face the other pair of second bushing flange long-side 225 and second bushing flange short-side 226, respectively.

Each of the second bushing flange long-sides 225 is composed of second bushing flange peaks 221, a second bushing flange valley 222, a second bushing flange inner-connecting portion 223, and a second bushing flange outer-connecting portion 224.

The second bushing flange peak 221 may refer to a region convexly bent in a direction away from the center of the second bushing 200, for example, a point spaced farthest apart from a central line B3-B3 of the second bushing 200 in a horizontal direction.

The second bushing flange valley 222 may refer to a region concavely bent in a direction approaching the center of the second bushing 200, for example, a point closest to the central line B3-B3 of the second bushing 200.

The second bushing flange inner-connecting portion 223 may refer to a region connecting the second bushing flange peak 221 to the second bushing flange valley 222, for example, a region connecting the second bushing flange valley 222, which has a convexly bent shape, to the second bushing flange peak 221, which has a concavely bent shape, in a straight line shape.

The second bushing flange outer-connecting portion 224 may refer to a region connecting the second bushing flange peak 221 to the second bushing flange short-side 226, for example, a region connecting the second bushing flange peak 221, which has a bent shape, to a distal end of the second bushing flange short-side 226, which has a straight line shape, in a straight line shape.

That is, each of the second bushing flange inner-connecting portion 223, the second bushing flange outer-connecting portion 224 and the second bushing flange short-sides 226 has a straight line shape extending to a predetermined length, thereby improving durability of the insulating bushing.

The inventor of the prevent invention developed a predetermined shape of the second bushing flange 220 described below through manufacture, testing and design change of various shapes of the second bushing flange 220 for improving insulating properties of the insulating bushing together with durability and waterproof performance.

As shown in FIG. 4, each of the second bushing flange long-sides 225 may be provided with a pair of second bushing bolt-holes 230 and the second bushing flange valley 222 may be disposed between an imaginary line A1-A1 and an imaginary line A2-A2, in which the imaginary line A1-A1 is a line connecting the second bushing bolt-holes 230 distant from the central line B3-B3 of the second bushing 200 to each other and the imaginary line A2-A2 is a line connecting the second bushing bolt-holes 230 near the central line B3-B3 of the second bushing 200 to each other. When the second bushing flange valley 222 is disposed inside the central line A1-A1, the insulating bushing can suffer from deterioration in waterproof performance, and when the second bushing flange valley 222 is disposed outside the central line A1-A1, the insulating bushing can suffer from excessive increase in manufacturing costs. That is, the insulating bushing according to the present invention is manufactured using a different material than a typical insulating bushing in the art, thereby reducing manufacturing costs while satisfying all of insulating properties, durability, and waterproof performance.

By way of example, the second bushing flange valley 222 may be disposed inside an imaginary central line A3-A3 connecting the pair of second bushing bolt-holes 230 in the second bushing flange long-side 225. With this structure, the insulating bushing can reduce manufacturing costs while achieving improvement in insulating properties, waterproof performance, and durability.

As shown in FIG. 4, each of the second bushing flange long-sides 225 may be provided with a pair of second bushing bolt-holes 230 and the second bushing flange valley 222 may be disposed inside an intersection point between an imaginary line A4-A4 and an imaginary line A5-A5, in which the imaginary line A4-A4 is a line connecting one second bushing bolt-hole 230 distant from the central line B3-B3 of the second bushing 200 to another second bushing bolt-hole 230 near the center of the second bushing 200 and the imaginary line A5-A5 is a line connecting one second bushing bolt-hole 230 near the central line B3-B3 of the second bushing 200 to another second bushing bolt-hole 230 distant from the central line B3-B3 of the second bushing 200. With this structure, the insulating bushing can reduce manufacturing costs while achieving improvement in insulating properties, waterproof performance, and durability.

As shown in FIG. 4, the second bushing passage 290 includes second bushing passage long-sides 291 and second bushing passage short-sides 292, which have straight line shapes extending to predetermined lengths. Here, the second bushing passage short-sides 292 may be disposed between an imaginary line B1-B1 connecting one-side ends of a pair of second bushing flange short sides 292 facing each other and an imaginary line B2-B2 connecting the other-side ends thereof. With this structure, the insulating bushing can achieve improvement in all of insulating properties, waterproof performance and durability.

As shown in FIG. 4, the second bushing flange 220 may have a flat lower surface. That is, as described above, since the second bushing 200 is formed of the composition including the unsaturated polyester and the glass fabrics to prevent hot air shrinkage through substantial improvement in thermal durability, the second bushing does not require formation of concave regions, such as cavities or ribs, thereby reducing manufacturing costs while achieving improvement in insulating properties, waterproof performance, and durability.

Figure 5:
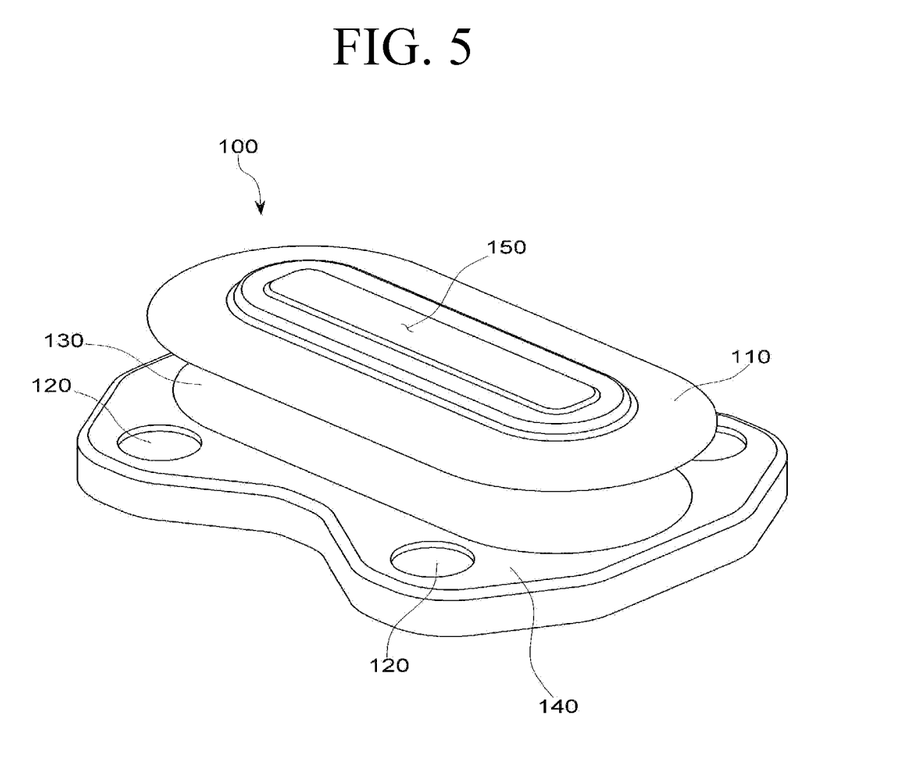
FIG. 5 is a view of a cover of the insulating bushing according to the embodiment of the present invention.
Figure 6:
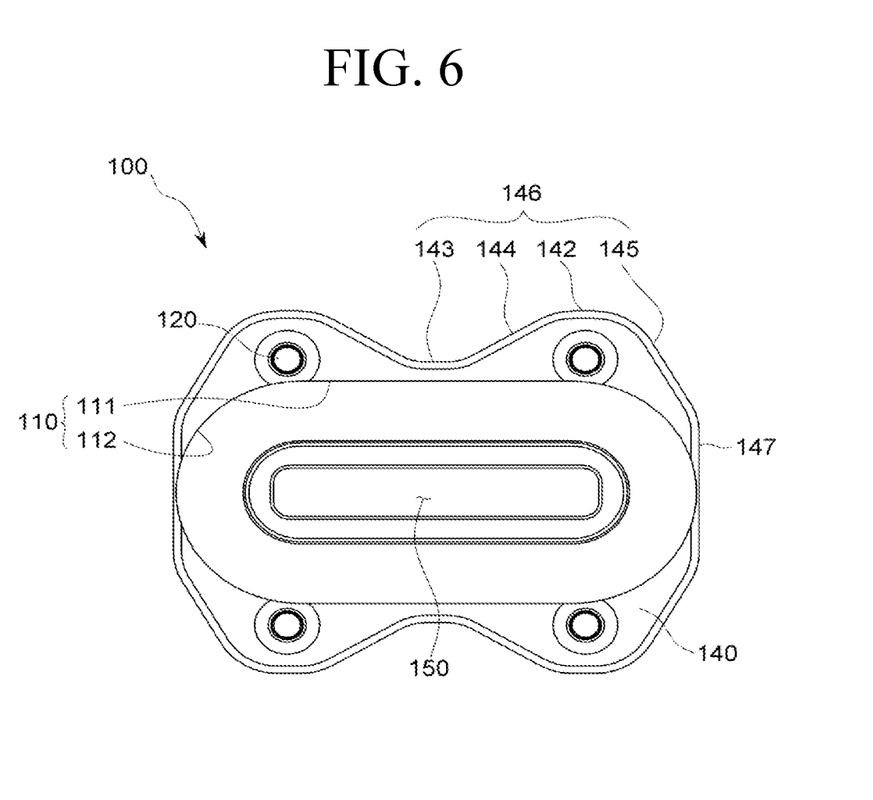
FIG. 6 is a top view of the insulating bushing according to the embodiment of the present invention.

FIG. 5 is a view of the cover of the insulating bushing according to the embodiment of the present invention and FIG. 6 is a top view of the insulating bushing according to the embodiment of the present invention.

Referring to FIG. 5 and FIG. 6, the cover 100 is coupled to the outer surface of the second bushing 200 and is provided with a cover passage 150 through which the busbar 10 (see FIG. 1) passes. The cover 100 includes a cover body 130, a lower cover flange 140, and an upper cover flange 110.

The upper cover flange 110 protrudes from an upper portion of the cover body 130 in the lateral direction and may have a predetermined tilt angle to improve drainage performance by preventing rainwater and the like from permeating to a location of the busbar 10 (see FIG. 1). For example, in side view of the cover 100, the upper cover flange 110 may be tilted at an angle of 5° to 20° from an upper end of the cover 100.

The cover body 130 may have a shape corresponding to the second bushing body 210.

The lower cover flange 140 protrudes from a lower portion of the cover body 130 in the lateral direction to surround the lower portion of the cover body 130 and may be formed with a plurality of cover bolt-holes 120.

Referring to FIG. 6, the lower cover flange 140 may be composed of lower cover flange long-sides 146 and lower cover flange short-sides 147 with reference to the shape of the cover passage 150. Each of the lower cover flange long-sides 146 may have an M shape including lower cover flange peaks 142 convexly bent in a direction away from the center of the cover 100 and a lower cover flange valley 143 concavely bent in a direction approaching the center of the cover 100. With this structure, the insulating bushing can achieve improvement in waterproof performance. For example, one pair of lower cover flange long-side 146 and lower cover flange short-side 147 is disposed to face the other pair of lower cover flange long-side 146 and lower cover flange short-side 147, respectively. For example, the lower cover flange 140 may have a shape corresponding to the second bushing flange 220.

The upper cover flange 110 may protrude from an upper portion of the cover body 130 in the lateral direction to surround the upper portion of the cover body 130.

As shown in FIG. 6, the upper cover flange 110 is composed of a pair of upper cover flange long-sides 111 extending in a straight shape and facing each other and a pair of upper cover flange short-sides 112 each connecting the pair of upper cover flange long sides 111 to each other, in which the upper cover flange long-sides 111 are disposed inside the lower cover flange valley 143, thereby improving insulating properties of the insulating bushing.

The upper cover flange short-sides 112 may extend in a curved shape and may be disposed inside the lower cover flange short-sides 147, thereby improving insulating properties of the insulating bushing.

Figure 7:
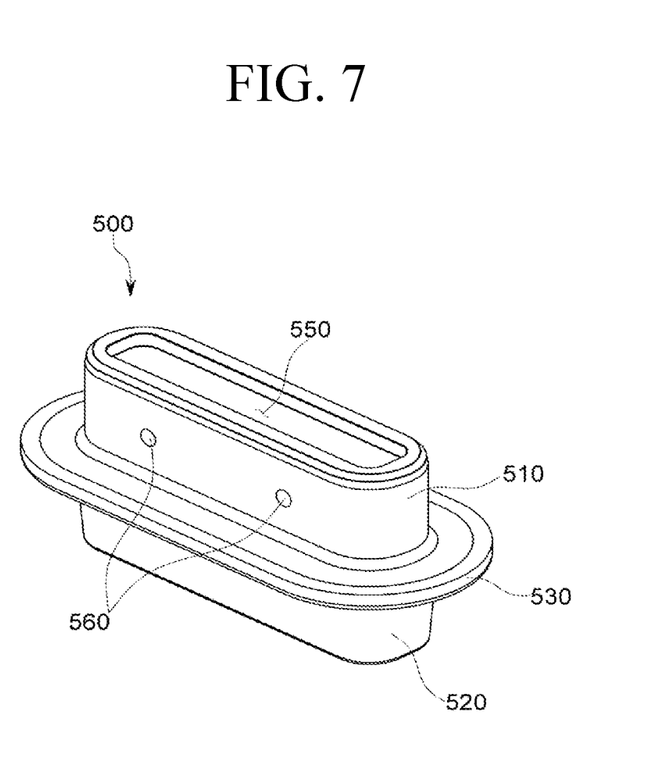
FIG. 7 is a perspective view of a first bushing of the insulating bushing according to the embodiment of the present invention.
Figure 8:
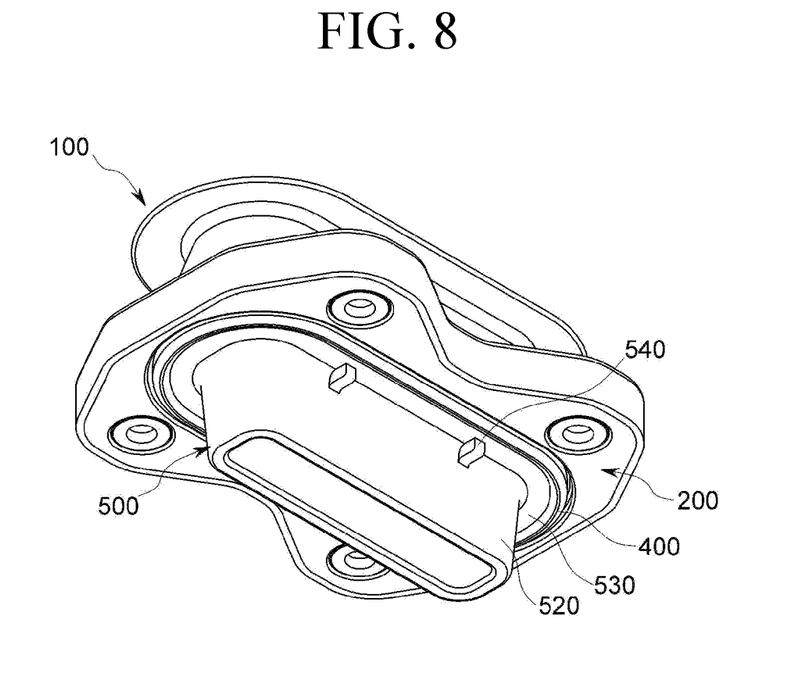
FIG. 8 is a bottom perspective view of the insulating bushing according to the embodiment of the present invention.

FIG. 7 is a perspective view of the first bushing of the insulating bushing according to the embodiment of the present invention and FIG. 8 is a bottom perspective view of the insulating bushing according to the embodiment of the present invention.

Referring to FIG. 7, the first bushing 500 is provided with a first bushing passage 550 through which the busbar 10 (see FIG. 1) passes, and is composed of the upper first bushing portion 510, the first bushing stopper 530, and the lower first bushing portion 520.

The upper first bushing portion 510 is a portion of the first bushing 500 received in the first bushing-receiving portion 250 and is formed with first bushing side-holes 560. With the busbar 10 (see FIG. 1) disposed to pass through the insulating bushing according to the present invention, securing pins are inserted into the first bushing side-holes 560 such that the busbar can be firmly secured to the insulating bushing thereby.

The first bushing stopper 530 protrudes from a lower portion of the upper first bushing portion 510 in the lateral direction to surround the lower portion of the upper first bushing portion 510.

The lower first bushing portion 520 may extend downward from the first bushing stopper 530.

Referring to FIG. 8, the lower first bushing portion 520 is provided at an upper portion thereof with bump blocks 540 protruding therefrom in the lateral direction.

The bump blocks 540 allow the insulating bushing to be stably mounted at an assembled location upon assembly of the insulating bushing to a fastening target, such as a switchboard, a transformer, a circuit breaker, an energy storage device, and the like, and maintain the insulating bushing in a stably assembled state without shaking even upon occurrence of vibration in the fastening target after assembly of the insulating bushing thereto.

The bump blocks 540 may be placed above the center of the lower first bushing portion 520, for example, at a location corresponding to one third of the height of the lower first bushing portion 520, specifically at a location within a quarter of the height of the lower first bushing portion 520. In addition, the bump blocks 540 may be placed inside the outermost ends of the first bushing stopper 530. Accordingly, the insulating bushing can be stably placed at an assembled location of the fastening target and can be maintained in a stably assembled state without shaking even upon occurrence of vibration in the fastening target after assembly of the insulating bushing.

Figure 9:
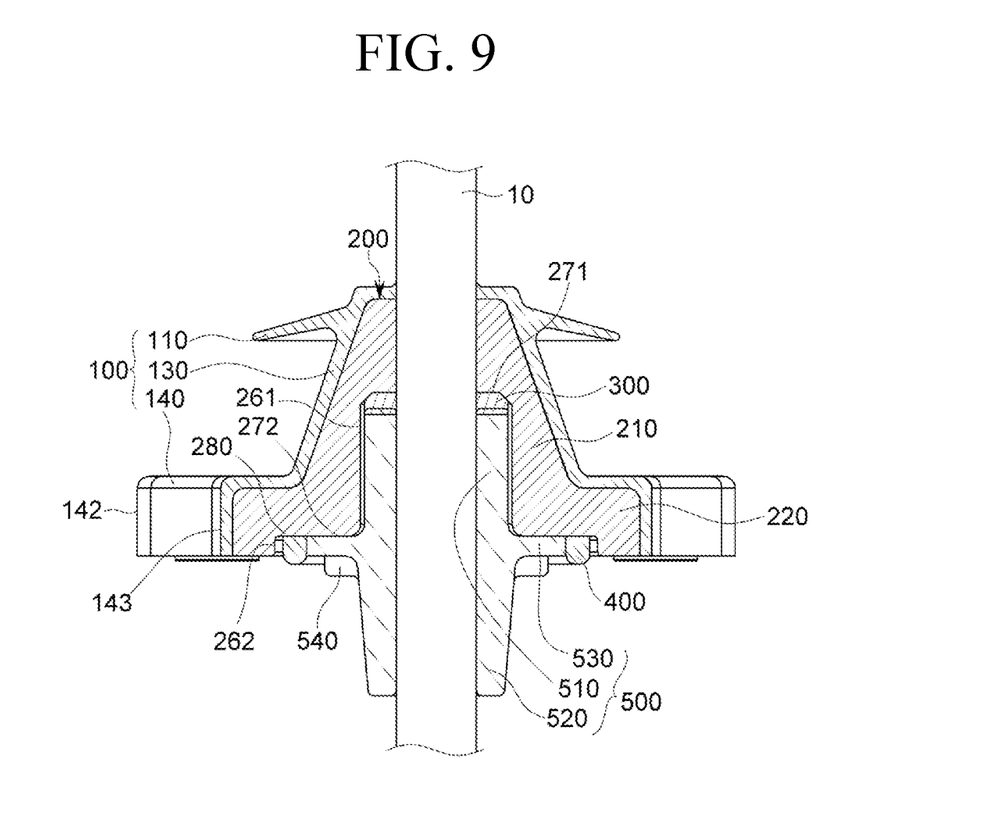
FIG. 9 is a cross-sectional view taken along line C1-C1 in FIG. 4.

FIG. 9 is a cross-sectional view taken along line C1-C1 in FIG. 4.

Referring to FIG. 2 and FIG. 9, the second bushing 200 may be formed therein with a first gasket seat 271, a first step 261, a second bushing seat 272, a second gasket seat 280, and a second step 262.

The first gasket seat 271 extends in the horizontal direction inside the second bushing body 210 to allow the first gasket 300 to be seated thereon. The first gasket 300 is adapted to allow an upper surface of the upper first bushing portion 510 to be firmly coupled and secured inside the first bushing-receiving portion 250 in the second bushing 200. For example, the first gasket 300 may be formed of a silicone resin, thereby improving waterproof performance of the insulating bushing.

The first step 261 is bent downward from the first gasket seat 271 and extends therefrom. The upper first bushing portion 510 slides on the first step 261 to be received therein.

The second bushing seat 272 is bent outward from the first step 261 and extends therefrom. The first bushing stopper 530 may be seated on the second bushing seat 272 to prevent foreign matter or moisture from entering the first bushing-receiving portion 250.

The second gasket seat 280 extends from the second bushing seat 272 in the horizontal direction to allow the second gasket 400 to be seated thereon. Here, the second gasket 400 is adapted to allow the first bushing stopper 530 to be firmly coupled and secured to a lower surface of the second bushing flange 220. For example, the second gasket 400 may be formed of a silicone resin, thereby improving waterproof performance of the insulating bushing.

For example, the second bushing seat 272 and the second gasket seat 280 may be continuous regions and may be separately referred to according to seating positions of the second bushing 200 and the second gasket 400. In another embodiment, the second gasket seat 280 may be more concavely formed than the second bushing seat 272.

The second step 262 is bent downward from the second gasket seat 280 and extends therefrom. The first gasket 300 may be disposed in a compressed state between the second step 262 and the upper first bushing portion 510, thereby preventing foreign matter or moisture from entering the first bushing-receiving portion 250.

Although some embodiments have been described herein with reference to the accompanying drawings, it should be understood that these embodiments are given by way of illustration only and the present invention is not limited thereto. The scope of the present invention should be limited only by the accompanying claims and equivalents thereto.

For example, the drawings schematically show each component to help understanding by those skilled in the art, and the thickness, length, number, and the like of each component shown in the drawings may differ from actual ones in the course of drawing creation. In addition, it should be understood that the material, shape and dimensions of each component in the embodiments are provided by way of illustration only and that various modifications, variations and alterations can be made by those skilled in the art without departing from the spirit and scope of the present invention.

<List of Reference Numerals>

| | |
|---|---|
| 10: | Busbar |
| 100: | Cover |
| 110: | Upper cover flange |
| 111: | Upper cover flange long-side |
| 112: | Upper cover flange short-side |
| 120: | Cover bolt-hole |
| 130: | Cover body |
| 131: | Second bushing receiving portion |
| 140: | Lower cover flange |
| 141: | Second bushing flange receiving portion |
| 142: | Lower cover flange peak |
| 143: | Lower cover flange valley |
| 144: | Lower cover flange inner-connecting portion |
| 145: | Lower cover flange outer-connecting portion |
| 146: | Lower cover flange long-side |
| 147: | Lower cover flange short-side |
| 150: | Cover passage |
| 200: | Second bushing |
| 210: | Second bushing body |
| 220: | Second bushing flange |
| 221: | Second bushing flange peak |
| 222: | Second bushing flange valley |
| 223: | Second bushing flange inner-connecting portion |
| 224: | Second bushing flange outer-connecting portion |
| 225: | Second bushing flange long-side |
| 226: | Second bushing flange short-side |
| 230: | Second bushing bolt-hole |
| 240: | Bolt-washer groove |
| 250: | First bushing-receiving portion |
| 261: | First step |
| 262: | Second step |
| 271: | First gasket seat |
| 272: | Second bushing seat |
| 280: | Second gasket seat |
| 290: | Second bushing passage |
| 291: | Second bushing passage long-side |
| 292: | Second bushing passage short-side |
| 300: | First gasket |
| 400: | Second gasket |
| 500: | First bushing |
| 510: | Upper first bushing portion |
| 520: | Lower first bushing portion |
| 530: | First bushing stopper |
| 540: | Bump block |
| 550: | First bushing passage |
| 560: | First bushing side-hole |
| 600: | Bolt washer |

The invention claimed is:

1. An insulating bushing adapted to protect a busbar and having improved insulating properties and waterproof performance, the insulating bushing comprising:
a first bushing provided with a first bushing passage through which the busbar passes;
a second bushing provided with a first bushing-receiving portion receiving an upper portion of the first bushing inserted through a lower portion of the first bushing-receiving portion and a second bushing passage through which the busbar passes; and
a cover coupled to an outer surface of the second bushing and provided with a cover passage through which the busbar passes,
wherein the second bushing comprises: a second bushing body; and a second bushing flange protruding from a lower portion of the second bushing body in a lateral direction thereof to surround the lower portion of the second bushing body and formed with a plurality of second bushing bolt-holes,
the second bushing flange being composed of second bushing flange long-sides and second bushing flange short-sides with reference to a shape of the second bushing passage,
the second bushing flange long-sides having an M shape with peaks and a valley,
wherein the cover comprises:
a cover body;
a lower cover flange protruding from a lower portion of the cover body in the lateral direction to surround the lower portion of the cover body and formed with a plurality of cover bolt-holes; and
an upper cover flange protruding from an upper portion of the cover body in the lateral direction to surround the upper portion of the cover body, wherein the lower cover flange is composed of lower cover flange long-sides and lower cover flange short-sides with reference to a shape of the cover passage, the lower cover flange long-sides having an M shape including lower cover flange peaks convexly bent in a direction away from a center of the cover and a lower cover flange valley concavely bent in a direction approaching the center of the cover.

2. The insulating bushing according to claim 1, wherein each of the second bushing flange long-sides comprises:
   second bushing flange peaks convexly bent in a direction away from a center of the second bushing; and
   a second bushing flange valley concavely bent in a direction approaching the center of the second bushing.

3. The insulating bushing according to claim 2, wherein:
   each of the second bushing flange long-sides is provided with a pair of second bushing bolt-holes; and
   the second bushing flange valley is disposed between an imaginary line A1-A1 and an imaginary line A2-A2, in which the imaginary line A1-A1 is a line connecting the second bushing bolt-holes distant from the center of the second bushing to each other and the imaginary line A2-A2 is a line connecting the second bushing bolt-holes near the center of the second bushing to each other.

4. The insulating bushing according to claim 2, wherein:
   each of the second bushing flange long-sides is provided with a pair of second bushing bolt-holes; and
   the second bushing flange valley is disposed inside an intersection point between an imaginary line A4-A4 and an imaginary line A5-A5, in which the imaginary line A4-A4 is a line connecting one second bushing bolt-hole distant from the center of the second bushing to another second bushing bolt-hole near the center of the second bushing and the imaginary line A5-A5 is a line connecting one second bushing bolt-hole near the center of the second bushing to another second bushing bolt-hole distant from the center of the second bushing.

5. The insulating bushing according to claim 2, wherein each of the second bushing flange long-sides further comprises:
   a second bushing flange inner-connecting portion connecting the second bushing flange peak to the second bushing flange valley; and
   a second bushing flange outer-connecting portion connecting the second bushing flange peak to the second bushing flange short-side.

6. The insulating bushing according to claim 5, wherein the second bushing flange inner-connecting portion and the second bushing flange outer-connecting portion have straight line shapes extending to predetermined lengths, respectively.

7. The insulating bushing according to claim 6, wherein each of the second bushing flange short-sides has a straight line shape extending to a predetermined length.

8. The insulating bushing according to claim 7, wherein the second bushing passage comprises second bushing passage long-sides and second bushing passage short-sides having straight line shapes extending to predetermined lengths, respectively, and
   the second bushing passage short-sides are disposed between an imaginary line B1-B1 connecting one-side ends of a pair of second bushing flange short-sides facing each other and an imaginary line B2-B2 connecting the other-side ends thereof.

9. The insulating bushing according to claim 1, wherein the second bushing body has a shape having a horizontal cross-sectional area gradually decreasing in an upward direction.

10. The insulating bushing according to claim 1, wherein the second bushing flange has a flat lower surface.

11. The insulating bushing according to claim 1, wherein the upper cover flange is composed of a pair of upper cover flange long-sides extending in a straight shape and facing each other and a pair of upper cover flange short-sides each connecting the pair of upper cover flange long sides to each other,
   the upper cover flange long-sides being disposed inside the lower cover flange valley.

12. The insulating bushing according to claim 1, wherein each of the upper cover flange short-sides extends in a curved shape and is disposed inside the lower cover flange short-side.

13. The insulating bushing according to claim 1, wherein the first bushing comprises:
   an upper first bushing portion received in the first bushing-receiving portion;
   a first bushing stopper protruding from a lower portion of the upper first bushing portion in the lateral direction to surround the lower portion of the upper first bushing portion; and
   a lower first bushing extending downward from the first bushing stopper,
   wherein the lower first bushing portion is provided at an upper portion thereof with bump blocks protruding therefrom in the lateral direction,
   the bump blocks being placed above a center of the lower first bushing portion.

14. The insulating bushing according to claim 13, wherein the bump blocks are formed inside the outermost ends of the first bushing stopper.

* * * * *